United States Patent
Blisse et al.

(10) Patent No.: US 12,546,350 B2
(45) Date of Patent: Feb. 10, 2026

(54) METAL CORNER CONNECTOR

(71) Applicant: Siemens Mobility GmbH, Munich (DE)

(72) Inventors: Johannes Blisse, Spardorf (DE); Alexander Hoffmann, Fuerth (DE); Peter Dornberger, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 610 days.

(21) Appl. No.: 17/614,632

(22) PCT Filed: May 4, 2020

(86) PCT No.: PCT/EP2020/062247
§ 371 (c)(1),
(2) Date: Nov. 29, 2021

(87) PCT Pub. No.: WO2020/239361
PCT Pub. Date: Dec. 3, 2020

(65) Prior Publication Data
US 2022/0228614 A1 Jul. 21, 2022

(30) Foreign Application Priority Data
May 29, 2019 (DE) .................... 10 2019 207 902.4

(51) Int. Cl.
*F16B 7/04* (2006.01)

(52) U.S. Cl.
CPC ........... *F16B 7/0446* (2013.01); *Y10T 403/34* (2015.01)

(58) Field of Classification Search
CPC .... F16B 7/0413; F16B 7/0446; F16B 7/0453; F16B 7/0473; F16B 9/01; Y10T 403/34;
(Continued)

(56) References Cited

U.S. PATENT DOCUMENTS 3,645,569 A * 2/1972 Reilly ................... F16B 7/0446
    403/217
3,778,175 A * 12/1973 Zimmer ................ E06B 3/9684
    52/645
(Continued)

FOREIGN PATENT DOCUMENTS

CN    108678621 A    10/2018
DE    2155272 A1    7/1972
(Continued)

OTHER PUBLICATIONS

"The Importance of Weld Beveling." 3-B Welding. Jul. 5, 2018, [online], [retrieved on May 4, 2024] Retrieved from the Internet <URL: https://www.3-bwelding.com/the-importance-of-weld-beveling>.*

*Primary Examiner* — Amber R Anderson
*Assistant Examiner* — Kevin J Baynes
(74) *Attorney, Agent, or Firm* — Laurence A. Greenberg; Werner H. Stemer; Ralph E. Locher (57) ABSTRACT

A metal corner connector contains at least two connection regions which are arranged on a lateral surface of the metal corner connector. At least one connection region is configured to be mechanically stably connected via welding to a metal pipe extending along a main extension plane of the metal corner connector. The connection region contains at least one protrusion with a groove, which is configured for receiving a welding material. The connection region has an outer surface which is adjacent to the protrusion and is configured as a contact surface for an end face of the metal pipe. A method produces a device having such a metal corner connector.

18 Claims, 6 Drawing Sheets

(58) Field of Classification Search
CPC ............... Y10T 403/348; Y10T 403/38; Y10T 403/4602; Y10T 403/50; Y10T 403/57; Y10T 403/7129; Y10T 403/7171
See application file for complete search history.

(56) References Cited

U.S. PATENT DOCUMENTS

| | | | | |
|---|---|---|---|---|
| 3,798,859 | A | | 3/1974 | de Jong |
| 4,072,432 | A | * | 2/1978 | Levy ..................... F16B 7/0446 403/176 |
| 4,076,432 | A | * | 2/1978 | Glaser ................... F16B 7/0446 403/171 |
| 4,516,376 | A | * | 5/1985 | King ....................... F16B 12/36 403/171 |
| 4,770,560 | A | * | 9/1988 | Ott ......................... F16B 37/005 403/348 |
| 4,988,230 | A | * | 1/1991 | Banthia ............... A47B 47/0008 403/231 |
| 5,059,056 | A | * | 10/1991 | Banthia ..................... F16B 7/00 403/231 |
| 5,228,259 | A | * | 7/1993 | Haddad ................ B62D 33/044 52/653.2 |
| 5,435,110 | A | * | 7/1995 | Stol ....................... B62D 29/008 403/171 |
| 6,332,657 | B1 | * | 12/2001 | Fischer ................. A47B 47/005 403/217 |
| 7,001,097 | B2 | * | 2/2006 | Wang ....................... F16B 9/09 403/231 |
| 7,883,288 | B2 | * | 2/2011 | Jorna .................... F16B 7/0453 403/171 |
| 10,450,737 | B2 | * | 10/2019 | Bowron ................. E04B 1/3483 |
| 10,781,838 | B2 | * | 9/2020 | Koepke ................. F16B 7/0413 |
| 11,162,522 | B2 | * | 11/2021 | Koepke ................. F16B 7/0413 |
| 11,286,970 | B2 | * | 3/2022 | Fuchs ....................... F16B 9/01 |
| 2002/0162936 | A1 | * | 11/2002 | Mellardo .............. F16B 7/0413 248/562 |

FOREIGN PATENT DOCUMENTS

| | | |
|---|---|---|
| DE | 20316758 U1 | 12/2003 |
| DE | 102014014768 A1 | 4/2016 |
| DE | 102017126456 A1 | 5/2019 |
| EP | 2868856 A2 | 5/2015 |
| FR | 2115787 A5 | 7/1972 |
| FR | 3012839 A1 | 5/2015 |

* cited by examiner

FIG 15

METAL CORNER CONNECTOR

FIELD AND BACKGROUND OF THE INVENTION

The invention specifies a metal corner connector, a method for producing a device having a metal corner connector, a device having a metal corner connector and a rail vehicle having a metal corner connector.

The intention is to provide a metal corner connector which mechanically connects at least two metal tubes to one another at any desired angle with very high mechanical stability. Furthermore, the intention is to specify a method for producing a device which has a metal corner connector of this kind, a device which has a metal corner connector of this kind and a rail vehicle which has a corner connector of this kind.

SUMMARY OF THE INVENTION

These objects are achieved by a metal corner connector having the features of the independent metal corner connector patent claim, by a method having the steps of the independent method patent claim, by a device having the features of the independent device patent claim and by a rail vehicle having the features of the independent rail vehicle patent claim.

Advantageous embodiments and developments of the metal corner connector, the method, the device and the rail vehicle form the subject matter of the respective dependent claims.

According to one embodiment, the metal corner connector comprises at least two connection regions, which are arranged on a lateral surface of the metal corner connector. As a particular preference, the metal corner connector has a first main surface and an opposite, parallel second main surface, between which the lateral surface of the metal corner connector is arranged.

According to one embodiment of the metal corner connector, at least one connection region is designed to be connected in a mechanically stable manner, by welding, to a metal tube extending along a main plane of extent of the metal corner connector. As a particular preference, during welding an HV weld seam is produced at least partially. This leads to a mechanically very stable connection between the metal tube and the metal corner connector.

According to one embodiment, the metal tube comprises a metal wall which delimits a cavity. In other words, the metal tube is internally hollow.

In the following, features and embodiments of the connection region are described in greater detail individually. The metal corner connector has at least two connection regions, wherein each of the connection regions can have the embodiments and features described below.

According to one embodiment, the connection region comprises at least one projection. As a particular preference, the projection comprises a groove, which is provided and designed to receive a welding material during the welding process. The welding material is generally material of the metal tube to be connected and/or material of the weld seam to be applied. In other words, the groove is preferably in the form of a weld-pool retention device. This leads to a particularly stable mechanical connection between the metal tube and the metal corner connector.

According to one embodiment, the connection region has an outer surface which is adjacent to the projection and is designed as a contact surface for an end face of the metal tube. In other words, the outer surface of the connection region preferably serves as a stop when the metal tube is placed on the connection region. In this way, the outer surface significantly simplifies positioning of the metal tube. With the aid of the connection region, it is advantageously possible as a rule to achieve alignment of the metal tube to be connected which does not deviate longitudinally by more than +/−1 mm from a predetermined value, while the angular accuracy of alignment is particularly preferably less than or equal to 1°.

According to one embodiment of the metal corner connector, the connection region has an inner region which is at least partially delimited by the projection. In this case, a front surface of the projection is preferably in the same plane as one of the two main surfaces of the metal corner connector. As a particular preference, the connection region is formed integrally with the metal corner connector. In other words, the connection region is preferably not delimited with respect to the remaining volume of the metal corner connector by a boundary surface. In particular, the connection region is preferably not produced separately from the remaining volume of the metal corner connector and then joined together.

According to a preferred embodiment, the connection region has a rectangular inner region. A connection region of this kind is intended, in particular, to be connected to a square metal tube. As a particular preference, the connection region with the right-angled inner region has two opposite web-shaped projections. The two opposite web-shaped projections preferably delimit the inner region. In this case, for example, front surfaces of the web-shaped projections are in each case in the same plane as one of the two main surfaces of the metal corner connector.

According to a further embodiment of the metal corner connector, the connection region has an inner region which is at least partially delimited by the projection, wherein a front surface of the projection is arranged set back from one of the two main surfaces of the metal corner connector. In this way, an outer surface is particularly preferably formed which completely surrounds the inner region and is designed as a contact surface for the metal tube. In this embodiment, it is advantageously possible to apply an HV weld seam all the way round the circumference of the metal tube to be connected when welding the metal tube to the metal corner connector. This leads to a particularly stable mechanical connection between the metal corner connector and the metal tube.

In this embodiment of the metal corner connector as well, it is possible for the connection region to have a rectangular inner region which is delimited by two opposite web-shaped projections. In this case, the front surfaces of the web-shaped projections are each arranged set back from one of the two main surfaces of the metal corner connector.

According to a further embodiment of the metal corner connector, the projection completely surrounds the inner region of the connection region. In this embodiment, the groove in the projection is also particularly preferably formed all the way round in the projection. In this embodiment, an HV weld seam can particularly advantageously be formed all the way round the circumference of the metal tube to be connected and, at the same time, a particularly good anchoring of the weld seam by the groove can be achieved.

According to a preferred embodiment of the metal corner connector, the metal corner connector comprises an extruded metal or is formed from an extruded metal. In this case, an extrusion direction of the metal preferably runs from the first main surface of the metal corner connector to the second main surface of the metal corner connector or vice versa. The use of an extruded metal simplifies the production of the metal corner connector and thus reduces its production costs. As an example, the metal corner connector comprises an extruded aluminum alloy or is formed from an extruded aluminum alloy. A metal corner connector made from an aluminum alloy is advantageously particularly light.

According to a further embodiment, the metal corner connector has at least one opening, which passes completely through the metal corner connector perpendicularly to the main plane of extent. For example, the opening is of round, angular or circular design. As a particular preference, the opening is designed to mechanically connect the metal corner connector to a further element by means of a connecting means. The connecting element may be a screw, a bolt or a rivet. The opening can be designed as a drill hole.

According to a further embodiment, the metal corner connector has at least one aperture, which passes completely through the metal corner connector perpendicularly to the main plane of extent. The aperture preferably serves for weight reduction. As a particular preference, the aperture has an irregular shape. For example, between adjacent apertures the metal corner connector comprises only ribs, which are responsible for the mechanical stability of the metal corner connector.

The metal corner connector described in the present case can be connected to a metal tube to form a device by means of the method described below. Features and embodiments which are described in the present case in connection with the metal corner connector can also be formed in the method and vice versa.

According to one embodiment of the method, a metal corner connector of the kind already described is provided. In a next step, a metal tube is placed on the connection region of the metal corner connector, such that an end face of the metal tube abuts against the outer surface of the connection region. Subsequently, the metal tube is connected to the metal corner connector in a mechanically stable manner by welding. In this case, it is particularly preferred if an HV weld seam is produced, at least partially.

According to a particularly preferred embodiment of the method, the wall of the metal tube has, in the part which is adjacent to the outer surface of the connection region, a structure for the welding process (weld seam preparation). This is, for example, a chamfer. With the aid of a chamfer, in particular, it is possible to achieve an HV weld seam during welding.

The device produced by the method is explained in greater detail below. Features and embodiments which are described in the present case in connection with the method can also be formed in the device and vice versa. It is also possible for all the features and embodiments which are described in connection with the metal corner connector to be formed in the device and vice versa.

According to one embodiment, the device comprises a metal corner connector and a metal tube extending along a main plane of extent of the metal corner connector. Here, the metal tube is connected to the metal corner connector in a mechanically stable manner by a weld seam.

According to one preferred embodiment, the device comprises a metal corner connector having at least two connection regions, which are arranged on a lateral surface of the metal corner connector. In addition, in this embodiment, the device comprises a metal tube extending along a main plane of extent of the metal corner connector. In this case, at least one of the connection regions comprises a projection having a groove and an outer surface which is adjacent to the projection. As a particular preference, the outer surface is here used as a contact surface for an end face of the metal tube. In this embodiment, the metal tube is connected to the metal corner connector in a mechanically stable manner by a weld seam, wherein a welding material of the weld seam is arranged in the groove.

According to one embodiment, the metal corner connector or the device is part of a rail vehicle.

The device is preferably designed to serve as a supporting device in a rail vehicle, such as a train or a railcar. Functional equipment of the rail vehicle, for example, can be secured in the supporting device. In particular, the device is preferably suitable for being loaded with a payload of about 50 kg to about 400 kg. In particular, a lightweight, mechanically stable device with a high load-bearing capacity can be achieved in a simple manner with the metal corner connector described here and the method described here.

The metal corner connector is based, inter alia, on the idea of providing a connection region with an outer surface which serves as a stop for a metal tube to be connected. In this case, it is possible to provide the metal tube with a corresponding structure, such that an HV weld seam can be produced between the metal connection region and the metal tube. In this way, a mechanically particularly stable connection can be produced.

The metal corner connector is furthermore designed in such a way that it can be produced particularly preferably from an extruded metal which does not have to be finish-machined at all or only slightly. This reduces the production costs of the metal corner connector.

On the basis of a device with the metal corner connector and a metal tube connected in this way, a lightweight and very stable supporting device can be produced which has a high load-bearing capacity.

The abovementioned properties, features and advantages of the invention and the manner in which these are achieved are explained in greater detail by the following description of the exemplary embodiments of the invention in conjunction with the corresponding figures, wherein

DETAILED DESCRIPTION OF THE INVENTION

In the figures, elements which are identical, of the same kind or identically acting are provided with the same reference signs. The figures and the size ratios of the elements illustrated in the figures to one another should not be considered to scale. On the contrary, individual elements may be shown on an exaggeratedly large scale for better representability and/or for better understanding.

Figure 1:
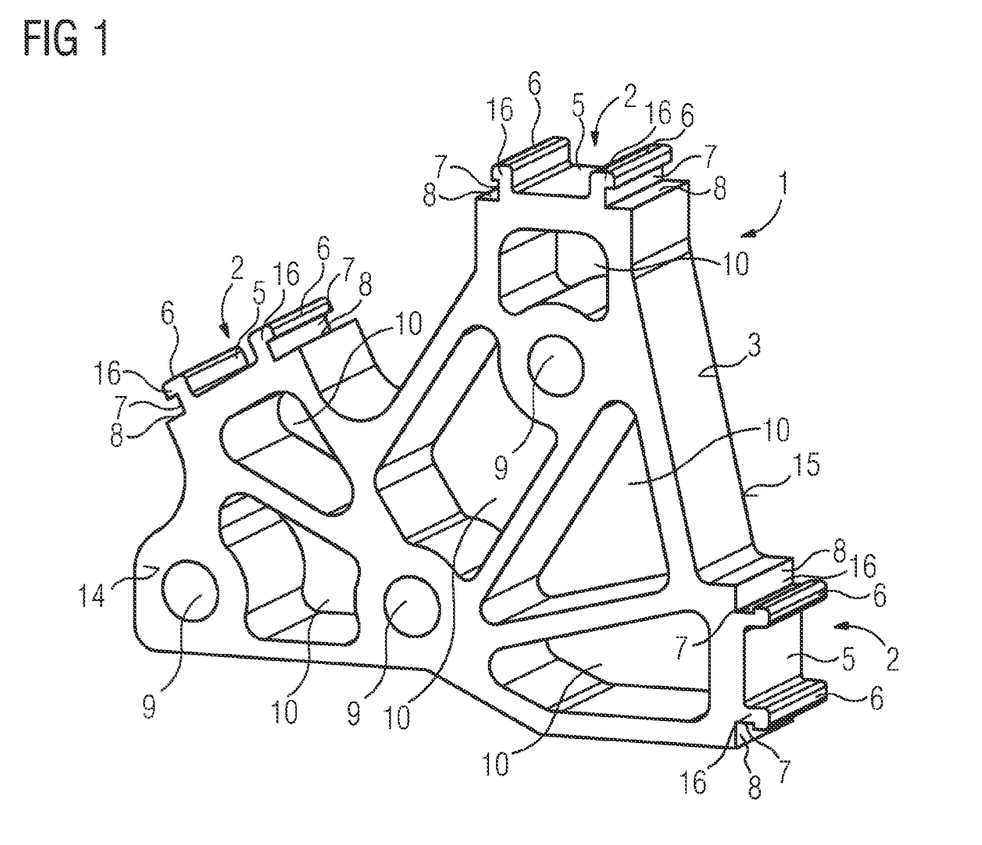
FIGS. 1 and 2 show schematic illustrations of a metal corner connector according to one exemplary embodiment, FIGS. 3 to 5 each show a perspective illustration of a metal corner connector according to one exemplary embodiment, FIGS. 6 to 7 each show a schematic sectional illustration of stages of a method for producing a device having a metal corner connector and a metal tube according to one exemplary embodiment.
Figure 2:
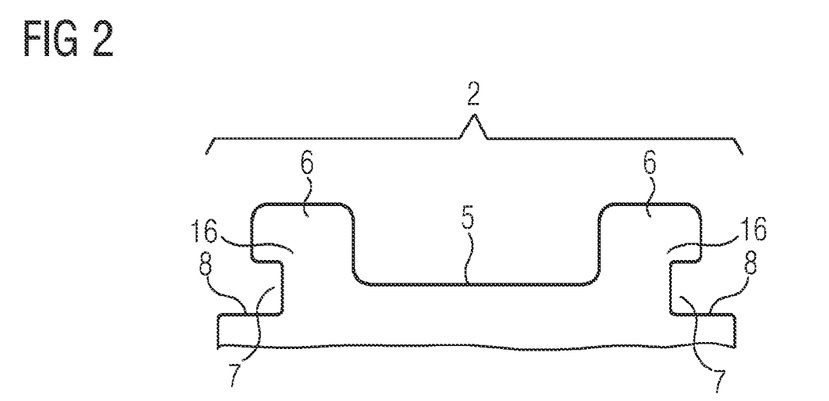

The metal corner connector 1 according to the exemplary embodiment of FIGS. 1 and 2 has three connection regions 2, which are arranged on a lateral surface 3 of the metal corner connector 1. The metal corner connector 1 has a first main surface 14 and a second main surface 15, each of which is aligned parallel to a main plane of extent of the metal corner connector 1.

In the present exemplary embodiment, the connection regions 2 are of identical design. Each connection region 2 is designed to be connected in a mechanically stable manner, by welding, to a metal tube 4 extending along the main plane of extent of the metal corner connector 1.

Each connection region 2 has a rectangular inner region 5, which is delimited on two opposite sides in each case by a projection 6. In this case, the projections 6 are of web-type design and have a groove 7, which in each case extends along a lateral surface of the web-type projection 6. The groove 7 is designed to receive a welding material. In the present exemplary embodiment, front surfaces 16 of the web-shaped projections 6 are in the same plane as the first main surface 14 and the second main surface 15 of the metal corner connector 1.

Furthermore, each connection region 2 has an outer surface 8 which is directly adjacent to the projection 6 and is designed as a contact surface for an end face of the metal tube 4. The present connection regions 2 are designed, in particular, to be connected in a mechanically stable manner to a square tube 4 by welding. The width between the outer surfaces 8 of the two opposite web-shaped projections 6 of a connection region 2 is in this case approximately two times less than a thickness of the wall of the metal tube 4 to be connected. In other words, in the present case the outer surface 8 of the connection region 2 has a width which corresponds to the wall thickness of the metal tube 4 to be connected. In this way, the metal tube 4 to be connected can be positioned on the connection region 2 in a particularly simple manner.

In the present case, the metal corner connector 1 is formed from an extruded aluminum alloy. Here, an extrusion direction of the metal corner connector 1 runs from the first main surface 14 of the metal corner connector 1 to the second main surface 15 of the metal corner connector 1 or vice versa.

Furthermore, the metal corner connector 1 has three openings 9, which in the present case are designed as drill holes. The drill holes enable further elements to be secured on the metal corner connector 1, with the aid of screws for example.

Moreover, the metal corner connector 1 has a plurality of apertures 10 with different irregular shapes, which serve for weight reduction. The lateral surface 5 of the metal corner connector 1 is mechanically stabilized by rib-shaped webs between the apertures 10.

Figure 3:
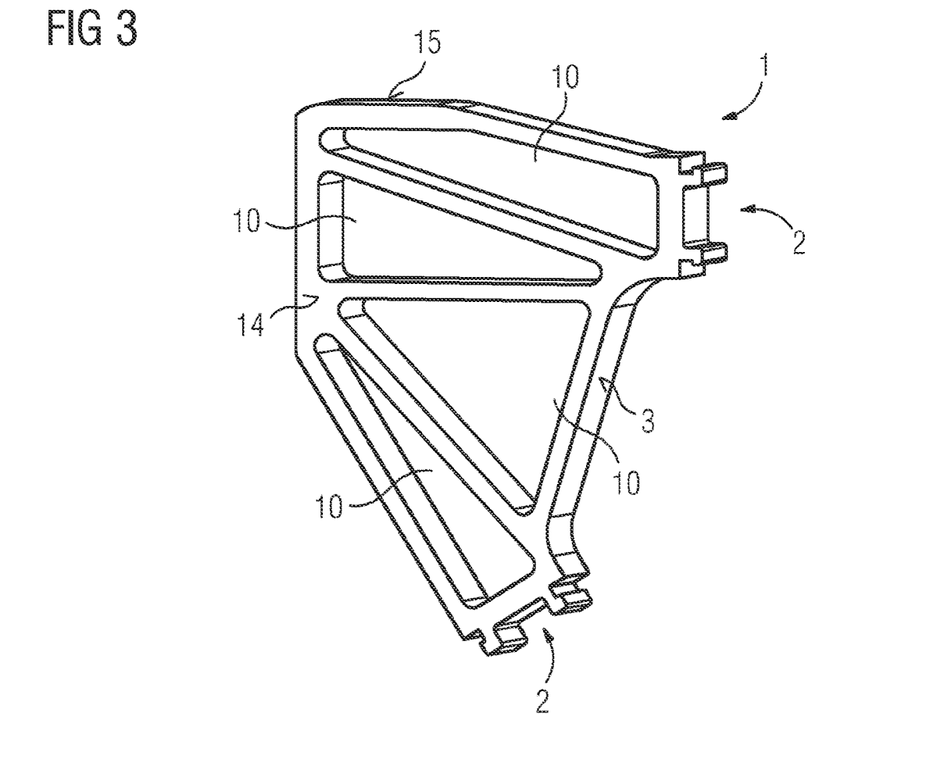
Figure 4:
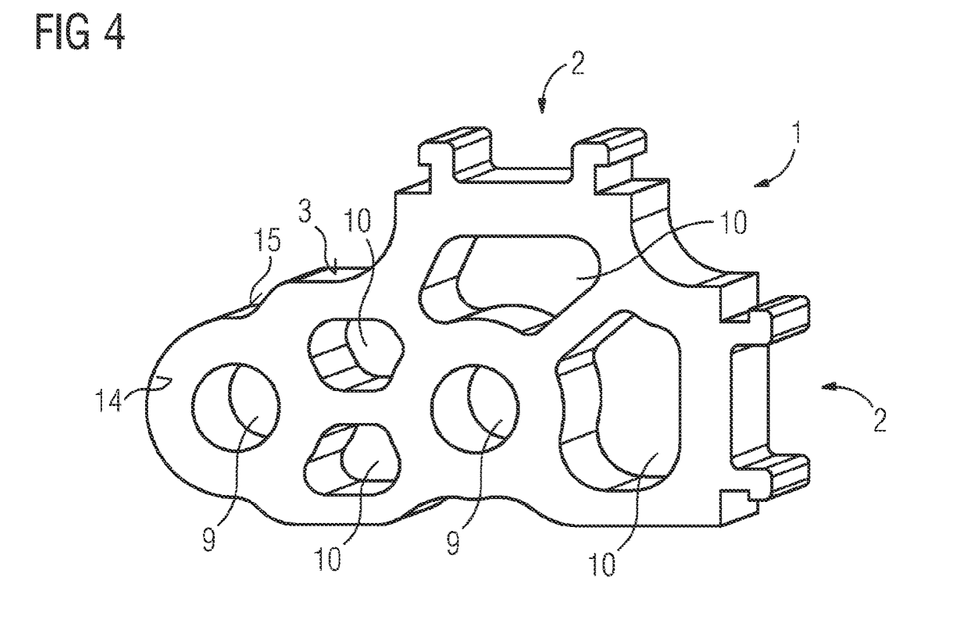
Figure 5:
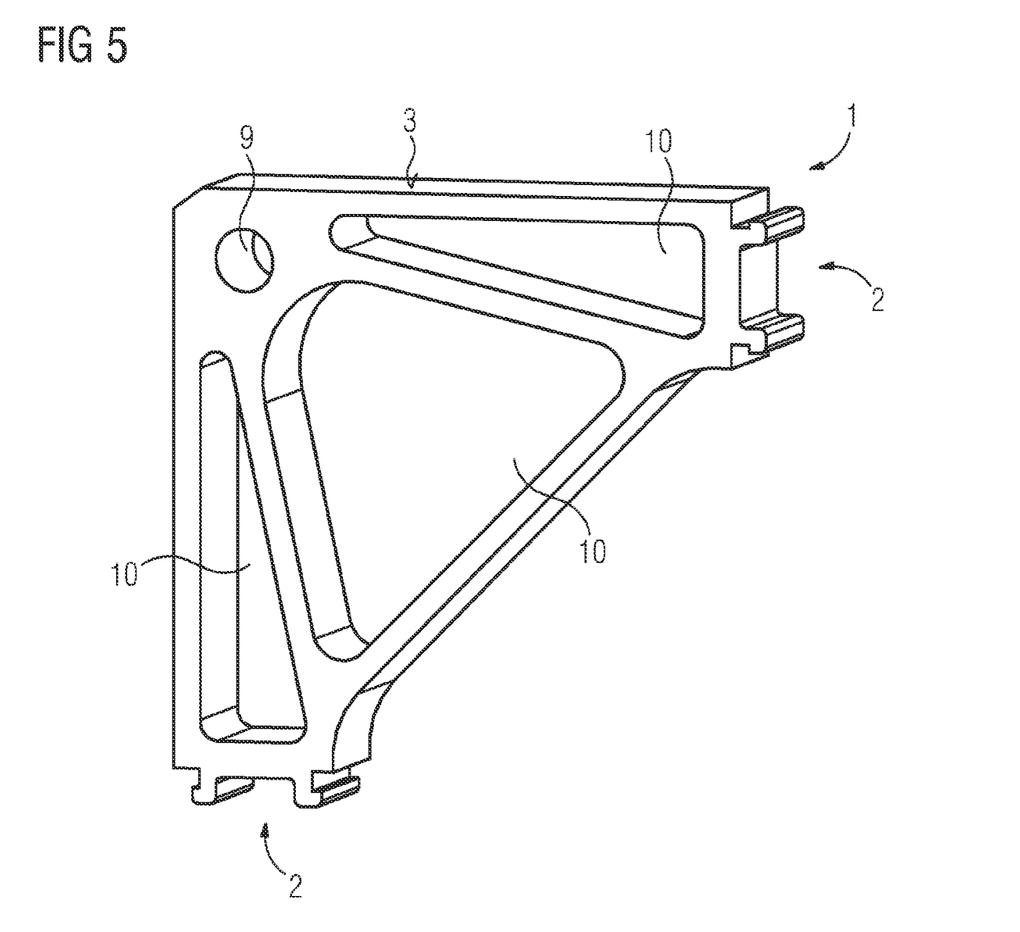

In contrast to the metal corner connector 1 according to the exemplary embodiment in FIGS. 1 and 2, the metal corner connector 1 according to the exemplary embodiments in FIGS. 3, 4 and 5 has only two connection regions 2 in each case. Furthermore, the metal corner connector 1 according to the exemplary embodiment in FIG. 3 is free of drill holes 9 for further connection to further elements. In particular, however, the connection regions 2 of the metal corner connectors 1 according to FIGS. 3, 4 and 5 are designed to be similar to the connection regions 2 of the metal corner connector 1 in FIGS. 1 and 2.

Figure 6:
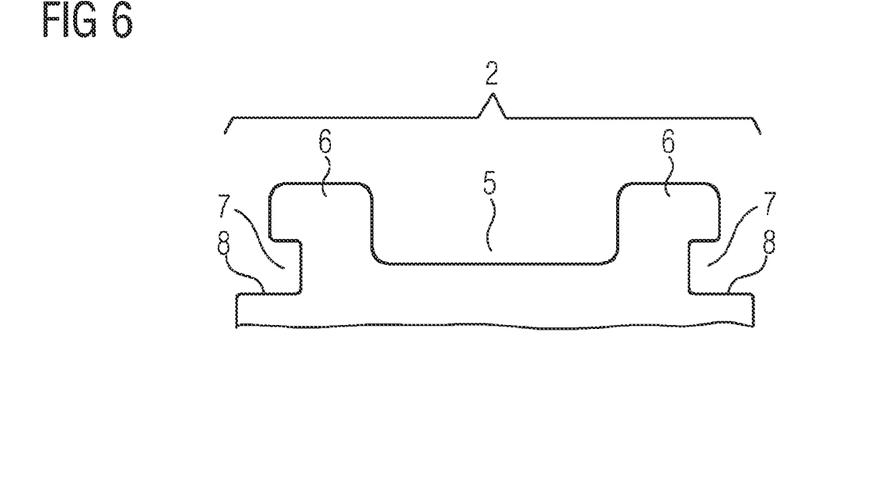

In the method according to the exemplary embodiment in FIGS. 6 to 7, a metal corner connector 1 of the kind which has already been explained in more detail with reference to FIGS. 1 and 2 is first provided (FIG. 6).

Figure 7:
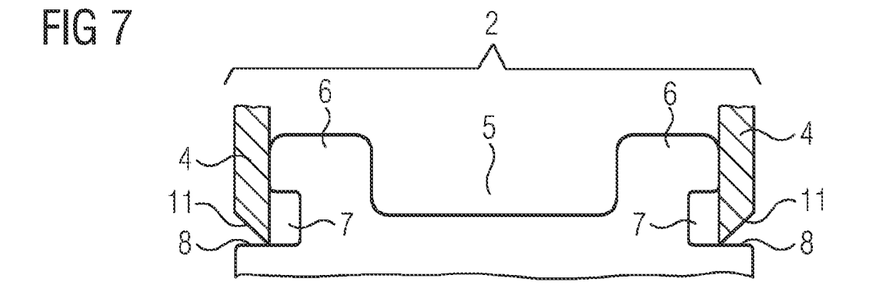

In a next step, a metal tube is placed on one of the connection regions (FIG. 7). In this case, an end face of the metal tube 4 abuts an outer surface 8 of the connection region 2. That part of the wall of the metal tube 4 which is directly adjacent to the outer surface 8 is provided with a structure 11, in the present case a chamfer, which is used for later welding of the metal tube 4. The chamfer is part of a weld seam preparation process, for example. The weld seam preparation process can comply with Standard DIN EN 15085-3.

In a next step, the metal tube 4 is welded to the connection region 2, during which process an HV weld seam 12 is produced, and the groove is filled at least partially with the material of the weld seam and/or of the metal tube. In the present case, the HV weld seam 12 is formed along the two web-shaped projections 6 of the connection region 2. On the two sides of the connection region 2, which are free of the web-shaped projections 6, the metal tube 4 is connected to the metal corner connector 1 materially and in a mechanically stable manner with the aid of a fillet weld seam 13 (see FIG. 11).

Figure 8:
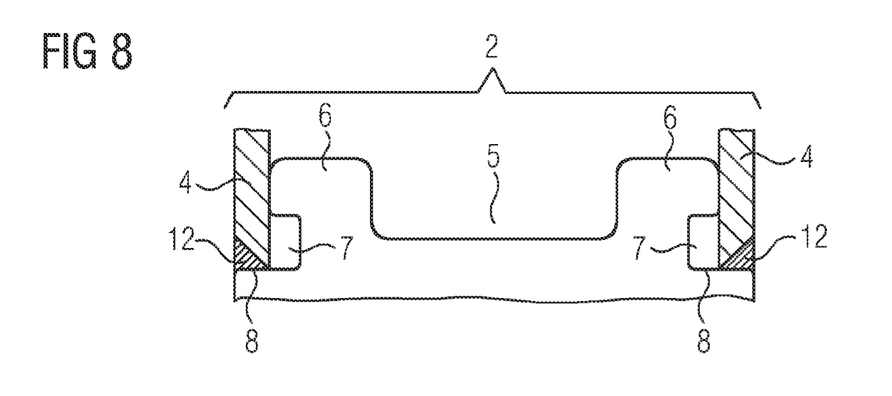
FIG. 8 shows a schematic sectional illustration of a device according to one illustrative embodiment.

In the present case, the device according to the exemplary embodiment in FIG. 8 is produced with the method according to the exemplary embodiment in FIGS. 6 and 7. The device according to the exemplary embodiment in FIG. 8 has a metal corner connector which is connected in a mechanically stable manner to a metal tube by means of an HV weld seam.

Figure 9:
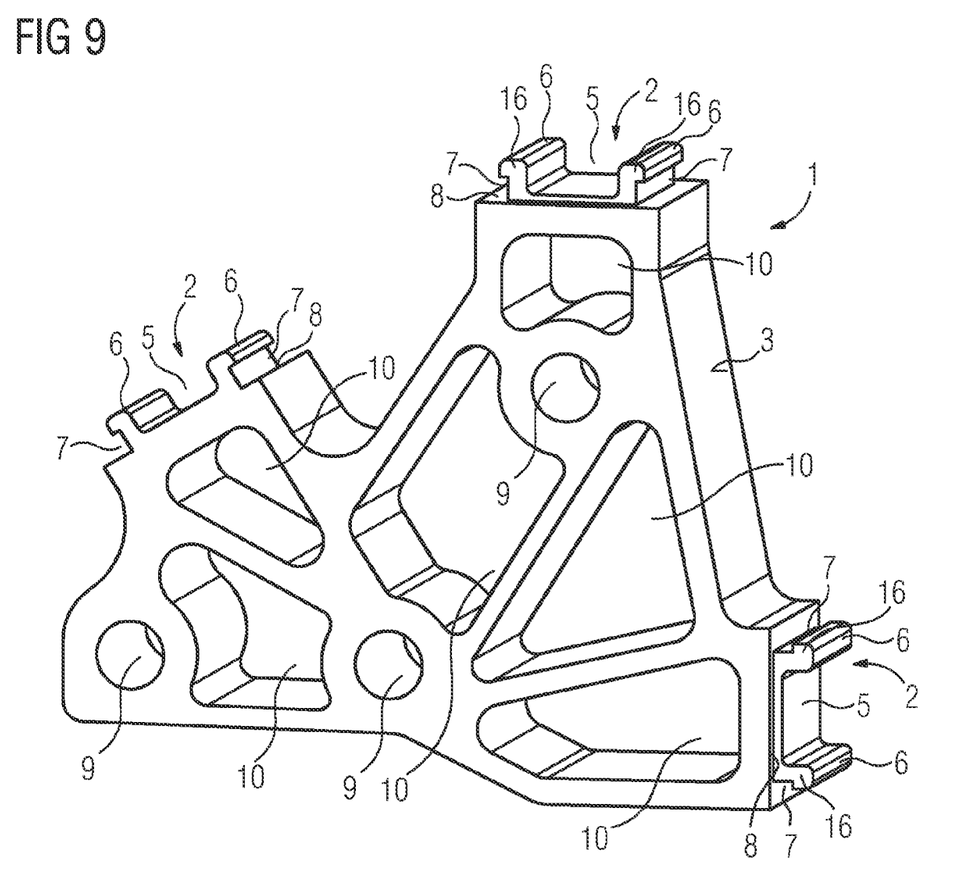
FIG. 9 shows a perspective illustration of a metal corner connector according to one exemplary embodiment.

The metal corner connector 1 according to the exemplary embodiment in FIG. 9 differs from the metal corner connector 1 according to the exemplary embodiment in FIGS. 1 and 2 in the design of the connection regions 2. While, in the case of the metal corner connector 1 according to the exemplary embodiment in FIGS. 1 and 2, front surfaces 16 of the web-shaped projections 6 are in the same plane as the first main surface 14 and the second main surface 15 of the metal corner connector 1, the front surfaces 16 of the web-shaped projections 6 are, according to the exemplary embodiment in FIG. 6, arranged so as to be set back with respect to the first main surface 14 and the second main surface 15 of the metal corner connector 1. In this way, the outer surface 8 is formed all the way round the inner region 5 of the connection region 2. In this way, the outer surface 8 serves all the way round the entire circumference of the metal tube 4 to be connected as a contact surface and as a stop for the metal tube 4 during the positioning thereof.

In this embodiment, it is possible, in particular, for an HV weld seam 12 to be formed all the way round the entire circumference of the metal tube 4 to be connected. Therefore, this embodiment of the metal corner connector 1 advantageously leads to a higher strength of the connection than the metal corner connector 1 according to the exemplary embodiment in FIGS. 1 and 2. However, the metal corner connector 1 according to FIG. 9 generally requires more finish-machining, by means of milling for example.

Figure 10:
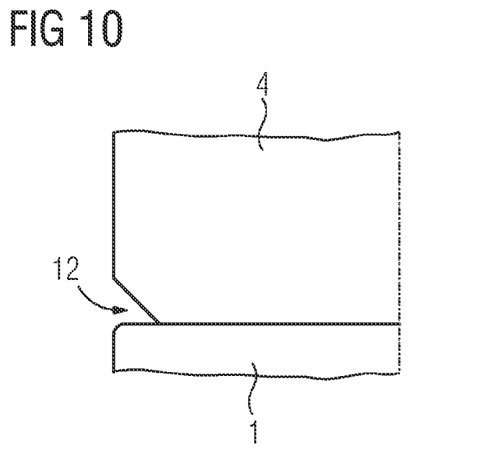
FIGS. 10 to 13 show schematic illustrations of the connection between the metal tube and the metal corner connectors according to various exemplary embodiments.
Figure 11:
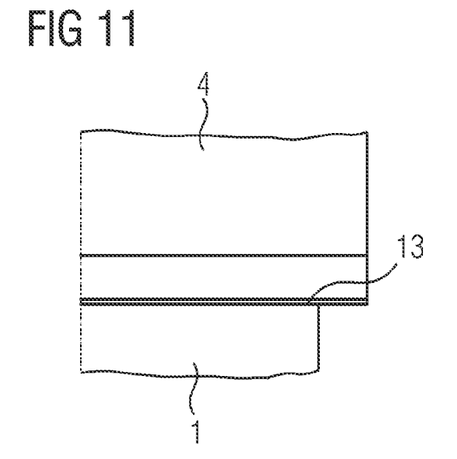

The connection between the metal corner connector 1 and the metal tube 4 which arises in the method according to the exemplary embodiment in FIGS. 6 to 7 is illustrated schematically in FIGS. 10 and 11. FIG. 10 shows a schematic illustration of the connection in the extrusion direction, i.e. from a first main surface 14 to a second main surface 15 of the metal corner connector 1, while FIG. 11 shows a schematic illustration of the connection orthogonally to the extrusion direction. In the extrusion direction, an HV weld seam 12 is applied to connect the metal tube 4 to the metal corner connector 1, while a fillet weld seam 13 is applied orthogonally to the extrusion direction.

Figure 12:
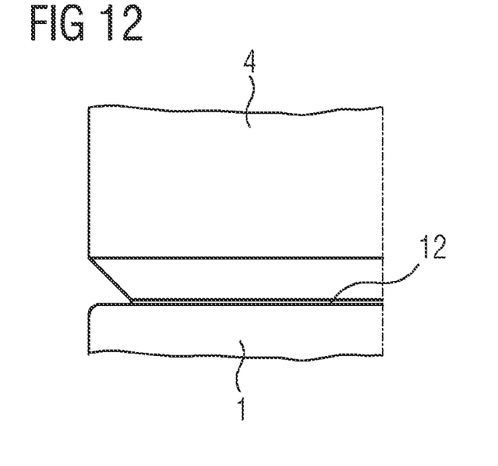
Figure 13:
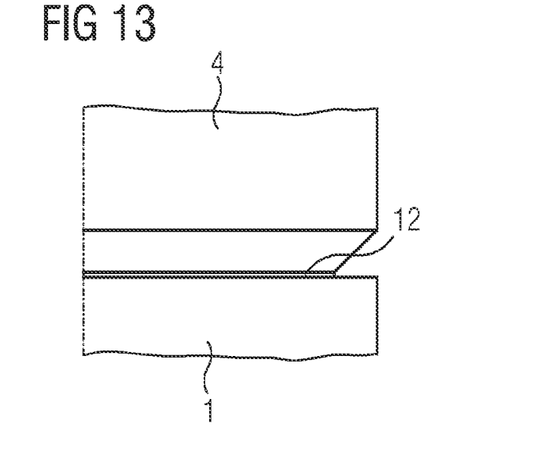

A detail of the connection between a metal tube 4 and the metal corner connector 1 according to the exemplary embodiment in FIG. 9 is illustrated in FIGS. 12 and 13. FIG. 12 shows the connection in the extrusion direction and FIG. 13 shows the connection orthogonally to the extrusion direction. Both in the extrusion direction and orthogonally to the extrusion direction, a fully encircling HV weld seam 12 can advantageously be produced.

Figure 14:
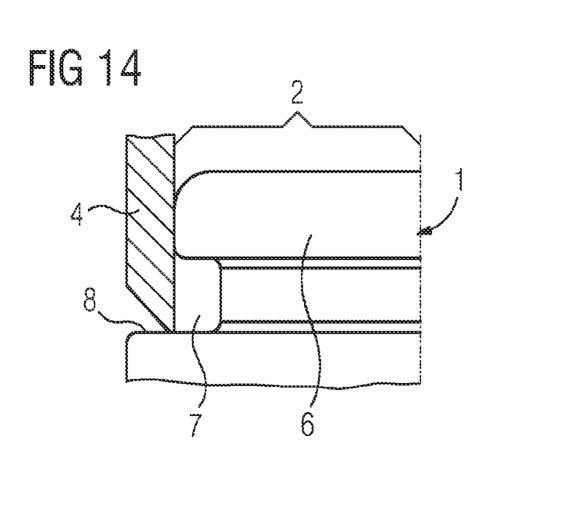
FIG. 14 shows a connection of a metal corner connector to a metal tube at a stage of a method according to a further exemplary embodiment.

In the method according to the exemplary embodiment in FIG. 14, a metal corner connector 1 is provided which, in contrast to the metal corner connector 1 according to FIG. 9, has a connection region 2 with a rectangular inner region 5 which is completely surrounded by web-shaped projections 6 with a groove 7.

In the method according to the exemplary embodiment in FIG. 14, a square metal tube 4 is placed on the connection region 2, the wall of which tube is placed on an outer surface 8 of the connection region 2 in such a way as to completely surround said surface. Then an HV weld seam 12 is produced all the way round the circumference of the metal tube 4 to be connected, wherein the groove 7 completely surrounding the inner region 5 in the web-shaped projections 6 is filled with the material of the HV weld seam 12 and/or of the metal tube 4. In this way, a particularly mechanically stable HV weld seam connection can be produced.

Figure 15:
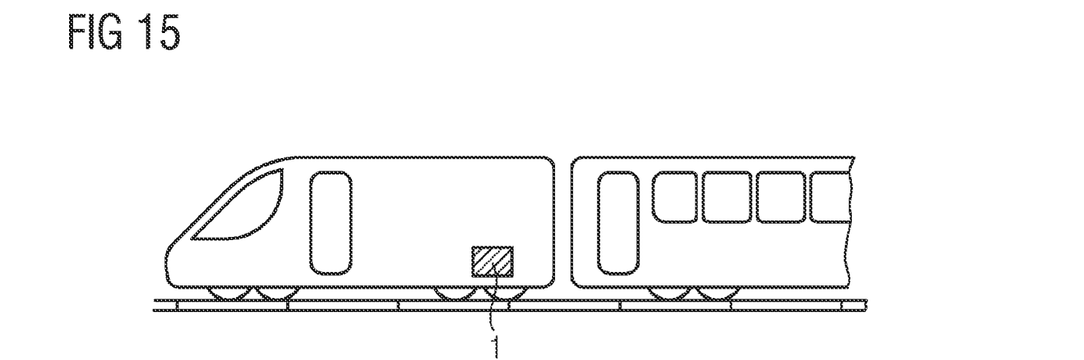
FIG. 15 shows a schematic illustration of a rail vehicle according to one exemplary embodiment.

The rail vehicle according to the exemplary embodiment in FIG. 15 has a metal corner connector of the kind which has already been described with reference to FIGS. 1 to 5, for example.

Although the invention has been illustrated and described in detail with reference to exemplary embodiments, the invention is not restricted to the exemplary embodiments disclosed and the specific combinations of features explained therein. Further variations of the invention can be obtained by a person skilled in the art without exceeding the scope of protection of the claimed invention.

The invention claimed is:

1. A metal corner connector, comprising:
   a body having a main plane of extent and a lateral surface, said body having a first main surface and a second main surface each being parallel to said main plane of extent; and
   at least two connection regions disposed on said lateral surface of said body, at least one of said connection regions configured to be connected in a mechanically stable manner, by welding, to a metal tube extending along said main plane of extent of the metal corner connector, said at least one connection region having projections, each of said projections having a respective groove formed therein extending along a side surface thereof and being configured to receive welding material, said at least one connection region having an outer surface being adjacent to one of said projections and configured as a contact surface for an end face of the metal tube, and said projections are each constructed as a cantilever with a base end affixed at said contact surface and a free end opposite said base end.

2. The metal corner connector according to claim 1, wherein said at least one connection region has an inner region which is at least partially delimited by one of said projections, one of said projections has a front surface that is in a same plane as said first main surface or said second main surface.

3. The metal corner connector according to claim 1, wherein said at least one connection region has an inner region which is at least partially delimited by at least one projection, of said projections, wherein said at least one projection has a front surface disposed set back from either said first main surface or said second main surface.

4. The metal corner connector according to claim 1, wherein:
   said at least one connection region has an inner region; and
   said projections completely surround said inner region of said at least one connection region, and said respective grooves extend around said projections.

5. The metal corner connector according to claim 1, wherein said body is formed from an extruded metal.

6. The metal corner connector according to claim 5, wherein said extruded metal is an extruded aluminum alloy.

7. The metal corner connector according to claim 1, wherein said body has at least one opening formed therein and passing completely through said body of the metal corner connector perpendicularly to the main plane of extent, wherein said at least one opening is configured for a mechanical connection of the metal corner connector to a further element by means of a connecting means.

8. A method for producing a device, which comprises the following steps of:
   providing the metal corner connector according to claim 1;
   placing the metal tube on the at least one connection region of the metal corner connector, such that the end face of the metal tube abuts against the outer surface of the at least one connection region; and
   connecting the metal tube to the metal corner connector in a mechanically stable manner by the welding.

9. The method according to claim 8, which further comprises producing a bevel (HV) weld seam, at least partially, during the welding.

10. The method according to claim 8, wherein a wall of the metal tube has, in a part which is adjacent to the outer surface of the at least one connection region, a structure for a weld seam.

11. A device, comprising:
   said metal corner connector according to claim 1; and
   said metal tube extending along the main plane of extent of said metal corner connector, said metal tube being connected to said metal corner connector in a mechanically stable manner by a weld seam.

12. The device according to claim 11, wherein the device is configured and provided as a supporting device in a rail vehicle.

13. A rail vehicle, comprising:
   said metal corner connector according to claim 1.

14. The metal corner connector according to claim 1, wherein said lateral surface extends between said first main surface and said second main surface.

15. The metal corner connector according to claim 14, wherein each said respective groove is parallel to said lateral surface and is configured to be directly opposite an inside wall surface of the metal tube.

16. The metal corner connector according to claim 1, wherein each of said free ends has a flange that defines a side of said respective groove and said contact surface defines an opposite side of said respective groove.

17. A metal corner connector, comprising:
a body having a lateral surface; and
at least two connection regions disposed on said lateral surface of said body, at least one of said connection regions configured to be connected in a mechanically stable manner, by welding, to a metal tube extending along a main plane of extent of the metal corner connector, said at least one connection region having at least one projection having a projection surface for abutting an inside wall surface of the metal tube, said projection surface having a groove formed therein, said groove being configured to receive welding material, and said at least one connection region having an outer surface being adjacent said groove and configured as a contact surface for an end face of the metal tube, said at least one projection being constructed as a cantilever with a base end affixed at said contact surface and a free end opposite said base end.

18. The metal corner connector according to claim 17, wherein said free ends end has a flange that defines a side of said groove and said contact surface defines an opposite side of said groove.

\* \* \* \* \*